United States Patent
Li et al.

(10) Patent No.: US 11,335,124 B2
(45) Date of Patent: May 17, 2022

(54) FACE RECOGNITION METHOD AND APPARATUS, CLASSIFICATION MODEL TRAINING METHOD AND APPARATUS, STORAGE MEDIUM AND COMPUTER DEVICE

(71) Applicant: Tencent Technology (Shenzhen) Company Limited, Shenzhen (CN)

(72) Inventors: Anping Li, Shenzhen (CN); Shaoxin Li, Shenzhen (CN); Chao Chen, Shenzhen (CN); Pengcheng Shen, Shenzhen (CN); Jilin Li, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 107 days.

(21) Appl. No.: 16/927,812

(22) Filed: Jul. 13, 2020

(65) Prior Publication Data
US 2020/0342214 A1    Oct. 29, 2020

Related U.S. Application Data

(63) Continuation of application No. PCT/CN2019/085462, filed on May 5, 2019.

(30) Foreign Application Priority Data

Jun. 5, 2018 (CN) .......................... 201810566938.8

(51) Int. Cl.
*G06K 9/62* (2022.01)
*G06V 40/16* (2022.01)

(52) U.S. Cl.
CPC ......... *G06V 40/172* (2022.01); *G06K 9/6262* (2013.01); *G06V 40/168* (2022.01)

(58) Field of Classification Search
CPC ................. G06K 9/00221–2009/00328; G06T 2207/20081; G06T 2207/20084; G06N 3/02–3/105; G06N 20/00–20/20
See application file for complete search history.

(56) References Cited

U.S. PATENT DOCUMENTS

2012/0314916 A1* 12/2012 Rothschild ......... G06K 9/00288
382/118
2014/0023269 A1    1/2014 Sudha et al.

FOREIGN PATENT DOCUMENTS

| CN | 106203331 A | 12/2016 |
| CN | 106548210 A | 3/2017 |

(Continued)

OTHER PUBLICATIONS

Liu et al., "SphereFace: Deep Hypersphere Embedding for Face Recognition", 2017 IEEE Conference on Computer Vision and Pattern Recognition (CVPR), Date Added to IEEE Xplore: Nov. 9, 2017, 2 bib pages + article pp. 212-220. (Year: 2017).*

(Continued)

*Primary Examiner* — Brian Werner
(74) *Attorney, Agent, or Firm* — Morgan, Lewis & Bockius LLP (57) ABSTRACT

This application relates to a face recognition method performed at a computer server. After obtaining a to-be-recognized face image, the server inputs the to-be-recognized face image into a classification model. The server then obtains a recognition result of the to-be-recognized face image through the classification model. The classification model is obtained by inputting a training sample marked with class information into the classification model, outputting an output result of the training sample, calculating a loss of the classification model in a training process according to the output result, the class information and model parameters of (Continued)

the classification model, and performing back propagation optimization on the classification model according to the loss.

20 Claims, 6 Drawing Sheets

(56) References Cited

FOREIGN PATENT DOCUMENTS

| CN | 107563279 A | 1/2018 |
|----|-------------|--------|
| CN | 108846340 A | 11/2018 |

OTHER PUBLICATIONS

Ranjan et al., "L2-constrained Softmax Loss for Discriminative Face Verification", Center for Automation Research, UMIACS, University of Maryland, College Park, MD 20742, arXiv:1703.09507v3 [cs.CV] Jun. 7, 2017, pp. 1-10. (Year: 2017).*
Tencent Technology, WO, PCT/CN2019/085462, Aug. 12, 2019, 5 pgs.
Tencent Technology, IPRP, PCT/CN2019/085462, Dec. 8, 2020, 6 pgs.
Tencent Technology, ISR, PCT/CN2019/085462, Aug. 12, 2019, 2 pgs.

* cited by examiner

FACE RECOGNITION METHOD AND APPARATUS, CLASSIFICATION MODEL TRAINING METHOD AND APPARATUS, STORAGE MEDIUM AND COMPUTER DEVICE

CROSS-REFERENCE TO RELATED APPLICATIONS

This application is a contiuation application of PCT Patent Application No. PCT/CN2019/085462, entitled "FACE RECOGNITION METHOD AND APPARATUS, CLASSIFICATION MODEL TRAINING METHOD AND APPARATUS, STORAGE MEDIUM AND COMPUTER DEVICE" filed on May 5, 2019, which claims priority to Chinese Patent Application No. 201810566938.8, filed on Jun. 5, 2018 and entitled "FACE RECOGNITION METHOD AND APPARATUS, CLASSIFICATION MODEL TRAINING METHOD AND APPARATUS, STORAGE MEDIUM AND COMPUTER DEVICE", all of which are incorporated by reference in its entirety.

FIELD OF THE TECHNOLOGY

This application relates to the field of computer technologies, and in particular, to a face recognition method and apparatus, a classification model training method and apparatus, a computer-readable storage medium and a computer device.

BACKGROUND OF THE DISCLOSURE

With development of artificial intelligence technologies, application ranges of face recognition are increasingly wide, for example, check on work attendance, unlock, and the like. The face recognition can be regarded as classification that can be implemented based on a classification model. The classification model is used for obtaining, after recognizing an object, a corresponding class of the object, for example, to determine whether the class of an animal in a picture corresponds to a cat or a dog. A function of the classification model is to extract a feature from input data such as an image or a voice, and to make comparison between the feature and class features, so as to achieve an objective of classification.

The classification model is obtained by training parameters of a neural network structure through a large quantity of marked training samples. In the classification model training process, the training is stopped in a case that a loss of the classification model meets expectations. The loss of the classification model reflects accuracy of a predicted result, and if accuracy of the predicted result is high, the loss of the classification model is small.

However, in a process of practical application, because the loss of the classification model is determined through a classification result of a training sample and an actual class of the training sample, a classification effect of the classification model is relatively poor at a beginning stage when the classification model is adjusted in the training process, resulting in relatively low overall training efficiency of the classification model.

SUMMARY

Embodiments of this application provide a face recognition method and apparatus, a classification model training method and apparatus, a computer-readable storage medium and a computer device, which can resolve a problem of relatively low overall training efficiency of a classification model when the classification model is adjusted in a training process.

According to one aspect, a face recognition method is provided, applied to a server having one or more processors and memory storing a plurality of computer programs to be executed by the one or more processors, the method including:

obtaining a to-be-recognized face image; and inputting the face image into a classification model, and obtaining a recognition result of the to-be-recognized face image through the classification model, the classification model being obtained by inputting a training sample marked with class information into a classification model and outputting an output result of the training sample, calculating a loss of the classification model in a training process according to the output result, the class information and model parameters of the classification model, and performing back propagation optimization on the classification model according to the loss.

According to another aspect, a server is provided, including one or more processors and memory, the memory storing a plurality of computer programs, and the computer programs, when executed by the one or more processors, causing the server to perform steps of the foregoing face recognition method.

According to another aspect, a non-transitory computer-readable storage medium is provided, storing a plurality of computer programs, the computer programs, when executed by one or more processors of a server, causing the server to perform steps of the foregoing face recognition method.

BRIEF DESCRIPTION OF THE DRAWINGS

To describe technical solutions of embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

Figure 1:
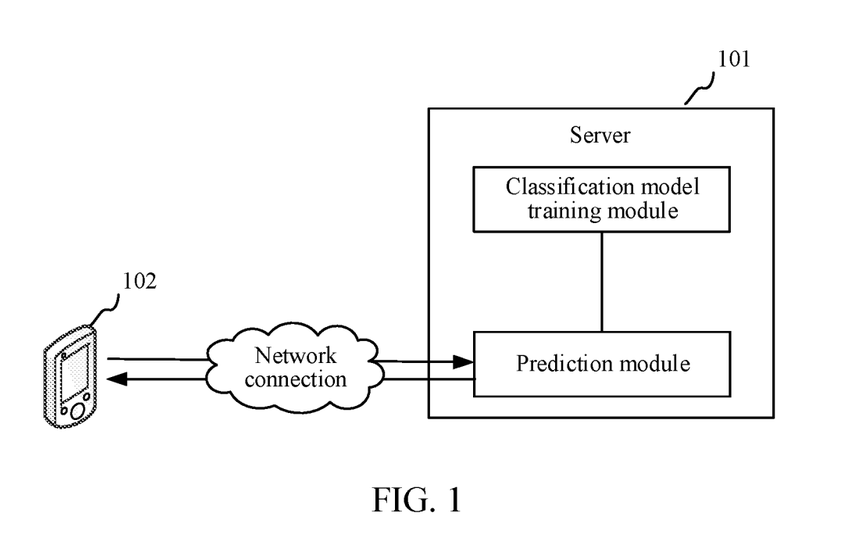
FIG. 1 is a schematic diagram of an application environment of a classification model training method according to an embodiment.

A classification model training method according to this application deeply learns massive data based on a neural network, and studies useful features, to achieve an objective of accurate classification. A classification model is used for resolving a classification problem in machine learning; and the classification problem is to attach tags to things, and usually results are discrete values. For example, whether an animal in a picture is a cat or a dog is determined. A function of the classification model is to extract a feature from input data such as an image or a voice, and to make comparison between the feature and class features, so as to achieve an objective of classification. An application scenario of the classification model can be image recognition, speech recognition, face recognition, or the like. FIG. 1 is a schematic diagram of an application scenario of a classification model training method according to an embodiment, and the application scenario includes a server 101 and a terminal device 102. The server 101 is connected to the terminal device 102 via a network.

The server 101 includes a classification model training module and a prediction module. The classification model training module performs a classification model training method, to obtain a classification model. The prediction module receives to-be-classified data inputted by the terminal device 102, to obtain a classification result. Based on a specific application scenario of the classification model, the terminal device can be an electronic device, such as smart home equipment, a mobile terminal, and equipment for check on work attendance. Based on a specific application of the terminal device, a voice signal or image information is collected and sent by the terminal device 102 to the server 101, and the server 101 makes classification to obtain a classification result. The server 101 sends the classification result to the terminal device 102. Based on the specific application scenario, the terminal device 102 can execute a relevant instruction such as home equipment wakeup or check on work attendance according to the classification result.

Figure 2:
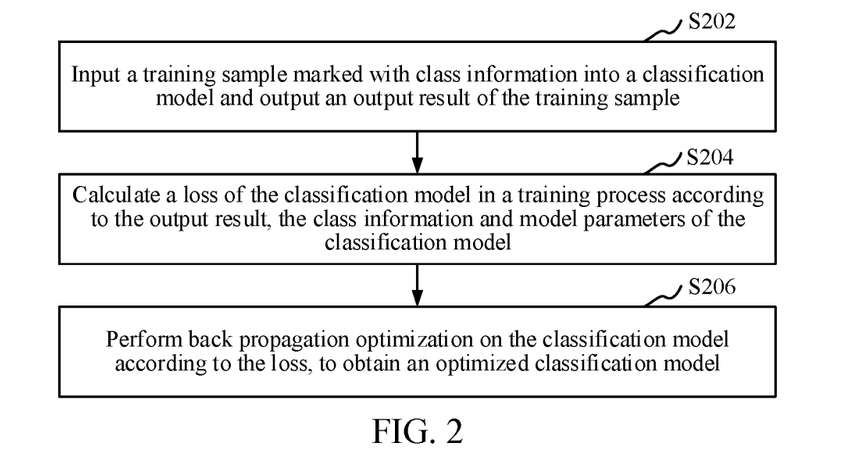
FIG. 2 is a flowchart of a classification model training method according to an embodiment.

In an embodiment, a classification model training method is provided. As shown in FIG. 2, the method includes the following steps:

S202. Input a training sample marked with class information into a classification model and output an output result of the training sample.

The classification model in this embodiment is established based on a neural network. Optionally, a convolutional neural network (CNN) such as a convolutional neural network framework of Inception-Resnet of Google or a convolutional neural network framework of densenet or dual-path networks can be used. The classification model, including a convolution layer, a pooling layer, and an activation function layer, extracts a multi-dimensional feature vector of input data through operations such as convolution, pooling and activation. Each sample participating in training will be abstracted as a $1 \times n_d$-dimension feature vector $f=(f_1, \ldots, f_{n_d})$ through the foregoing processing, $f=(f_1, \ldots, f_{n_d})$ representing a feature dimension quantity. Optionally, the feature dimension quantity $n_d$ corresponds to the total number of classes; and optionally, the value of the feature dimension quantity is consistent with the value of the total number of classes.

Specifically, classification model training is to input enough samples into a network and to adjust a structure of the classification model through a certain algorithm, thereby making an output of the classification model consistent with an expected value. The training sample in this embodiment is sample data required for the classification model training, and can be an image, a sound, a text or the like, marked with class information.

Optionally, in the process of obtaining the output result according to the classification model, the multi-dimensional feature vector of the training sample is first obtained, the multi-dimensional feature vector is projected into a hypersphere feature projection space, to obtain a projection feature, and classification is performed in the hypersphere feature projection space. Compared with a conventional high-dimensional feature space, the hypersphere feature projection space is provided with better effects of feature mapping and feature classification. In this embodiment, a hypersphere radius R can be a fixed empirical value or an optimized value determined according to training data in the training process, and the projection feature is a product of the hypersphere radius and the multi-dimensional feature vector.

Optionally, the projection feature is inputted into a fully connected layer of the classification model, to obtain the output result of the classification model for the training sample, a function of the fully connected layer being to integrate the projection features, to obtain, according to an input (the projection feature vector) of the fully connected layer and parameters of the fully connected layer, a higher-layer meaning of the sample, namely, a global feature vector to be used for classification later. The fully connected layer (FC) functions as a "classifier" in the whole convolutional neural network.

The classifier is a softmax layer of the classification model. The input of the softmax is a T*1 vector, and the output is also a T*1 vector, each value of the vector representing a probability that the sample belongs to each class. Namely, the output result of the softmax layer is probabilities that the sample belongs to classes.

S204. Calculate a loss of the classification model in a training process according to the output result, the class information and model parameters of the classification model.

Optionally, a conventional loss of the classification model is calculated according to the output result and an actual class of the training sample, namely, a softmax loss. The softmax loss of the classification model is related to whether a predicted classification result is correct. The loss is smaller with higher accuracy of the predicted result; the loss is bigger with lower accuracy of the predicted result. A training objective of the classification model established based on a neural network is usually to decrease the loss of the classification model.

Optionally, in this application, based on the conventional softmax loss, the model parameters of the classification model are taken into consideration, and the loss of the classification model is calculated according to the softmax loss and the model parameters of the classification model. Because of being calculated according to the model parameters of the classification model, the obtained loss of the classification model in the method in this application continuously decreases in the training process, increasing training efficiency of the classification model.

S206. Perform back propagation optimization on the classification model according to the loss, to obtain an optimized classification model.

A process of the back propagation is a process of adjusting parameters of the neural network of the classification model according to the loss.

Optionally, the method of this application for performing back propagation optimization on the classification model according to the loss can be performed by using a conventional back propagation method. Namely, the training continues to be performed based on the optimized classification model after updating the relevant parameters of the classification model, until a training stop condition is reached, to obtain final relevant parameters of the classification model. The training stop condition can be that the loss is stable and reaches a set value, or that the number of training iterations reaches a set number of iterations, and the like.

In the foregoing classification model training method, the model parameters of the classification model are adjusted according to the output result of the training sample, the model parameters are taken into consideration based on the conventional softmax loss, and the loss of the classification model is calculated according to the softmax loss and the model parameters. Because of being calculated according to the model parameters of the classification model, the obtained loss of the classification model in the method in this application continuously decreases in the training process, to avoid a problem that the loss does not decrease in a long time in the training process, thereby increasing training efficiency of the classification model.

In an optional embodiment, the loss includes at least one of a hypersphere radius loss and a margin loss; the classification model includes a hypersphere feature projection space, the model parameters include a space radius corresponding to the hypersphere feature projection space, and the hypersphere radius loss is used for representing a loss of the space radius corresponding to the hypersphere feature projection space; and the margin loss is used for representing an incidental loss of the classification model in a recognition process, and the model parameters include a margin value between the training sample and a class in the classification model. The foregoing two losses are separately described.

The classification model training method further includes a step of adjusting the hypersphere radius in a case that the loss includes the hypersphere radius loss. Specifically, the step includes: obtaining a loss calculated in the last training of the classification model, and calculating a change amount of the classification model; calculating, according to the change amount and the space radius of the hypersphere feature projection space applied in the last training, a space radius of the hypersphere feature projection space applied in the current training; and calculating the hypersphere radius loss according to the space radius of the hypersphere feature projection space applied in the current training.

In the conventional method, the multi-dimensional feature vector is projected into the hypersphere projection space with a fixed radius, but there is no reasonable method for selecting a size of the hypersphere radius R, which is a value fixed based on experience. In practice, the size of the hypersphere radius R depends on training data, values of the hypersphere radius R fluctuate greatly with different training data, and different values of the hypersphere radius R greatly affect a training result. Consequently, it is very inconvenient for parameter adjustment to select a fixed value manually, and it is also very difficult to obtain, through adjustment, an optimal value of the hypersphere radius R, which directly affects training effects.

In this application, according to the loss of the classification model in the last training, the hypersphere radius R in the current training is adaptively learned, and the hypersphere radius loss is calculated. Optionally, the change amount of the classification model is calculated according to the loss of the classification model in the last training. In the output result of the classification model in the last training, a class with a largest probability is taken as a predicted class, and the accuracy of the predicted result can be determined according to the predicted class and the actual class. The more accurate the predicted result is, the smaller the loss of the classification model is, and the smaller the change amount of the classification model is; and the more deviated the predicted result is, the bigger the loss of the classification model is, and the bigger the change amount of the classification model is. Specifically, the change amount is the change amount of parameters, namely, $\Delta$ value, calculated according to the loss in the back propagation in the last training.

A space radius of the hypersphere feature projection space in the current training is calculated according to the change amount and the space radius of the hypersphere feature projection space applied in the last training. The change amount can represent a change amount of the parameters. A bigger change amount represents a bigger adjustment range of the parameters. In this case, feature vectors are projected into the hypersphere feature projection space with a fixed radius, and the distance between the features is close, which is not conducive to feature classification. In this application, the hypersphere radius is adaptively learned according to the change amount, and the size of the feature space is adjusted, so as to make the projections of the features in the hypersphere feature projection space more scattered, promoting the better classification of the features, and reducing the loss of the classification model in the current training.

Further, the projecting the multi-dimensional feature vector of the training sample into a hypersphere feature projection space, to obtain a projection feature includes: projecting the multi-dimensional feature vector into the hypersphere feature projection space according to the space radius of the hypersphere feature projection space in the current training, to obtain a projection feature.

Optionally, the method for performing projection according to the radius of the hypersphere feature projection space includes:

$$\tilde{f} = R\hat{f}$$

where $\tilde{f}$ is a projection feature; $\hat{f}$ is a multi-dimensional feature vector, and R is a space radius of the hypersphere feature projection space in the current training.

Further, the hypersphere radius loss is a part of the loss of the classification model. In this application, by introducing the hypersphere radius loss, the learned hypersphere radius R is constrained, which can prevent the hypersphere radius R from getting too big or too small after learning. Optionally, a method for calculating the hypersphere radius loss R loss is:

$$L_R = (R - R_{min})^2$$

where R is the learned hypersphere radius in the current training; and $R_{min}$ is an empirical value, specifically representing that the learned value R is intended to be not smaller than the empirical value. Optionally, the empirical value $R_{min}$ is a preset value.

In another embodiment, model parameters further include a margin value, the margin value being a margin value between a training sample and a corresponding class, namely, the margin value being obtained according to classes provided in a classification model. The margin value is an inter-class distance. A relatively small margin value indicates that two adjacent classes are similar, which is not conducive to feature classification.

Conventionally, a fixed margin value, which is expected to increase training difficulty and make feature mapping obtained through training better, is added forcibly in a case of calculating a sample softmax loss. However, in practice, at the beginning of the training, classification effects of the model are very poor, and if a fixed margin value is directly added, the training loss is very large and non-convergence of the training is caused, increasing the training difficulty at the beginning.

In this embodiment, a cosine similarity between the training sample and each class is determined according to the output result of the training sample; the margin value corresponding to the training sample is calculated according to the cosine similarity; and a margin loss is calculated according to the margin value.

As described above, the output result of the training sample includes the probability that the sample belongs to each class. The probability can be specifically determined through an included angle between a projection feature vector of the training sample and each class of parameters of a fully connected layer, that is, the probability being the cosine similarity between the projection feature of the training sample and each class of parameters of the fully connected layer. The smaller the included angle between the projection feature vector of the training sample and each class of parameters of the fully connected layer, the bigger the cosine similarity between the training sample and the class of features, and the bigger the probability that the training sample belongs to the class is; and the bigger the included angle between the projection feature vector of the training sample and each class of parameters of the fully connected layer, the smaller the probability that the training sample belongs to the class is.

Generally at the beginning of the training, a relatively small margin value is added, and in a case that the classification effects are good, a relatively big margin value is added generally at the later stage of the training. Such adaptive adjustment of the margin value in different periods ensures that the network can learn better mapping features at the later stage of the training, and greatly reduces the training difficulty at the beginning of the training.

Taking face recognition as an example, ideal face recognition is expected to achieve effects of reducing an intraclass distance and expanding the margin value, to implement accurate face recognition.

Features learned by a softmax loss are distributed angularly, which shows a poor compatibility between a Euclidean distance loss and the softmax loss. An angular distance is put forward in this application. Optionally, $m_i$ is a margin value between sample i and a certain class. The determining, according to the output result of the training sample, a cosine similarity between the training sample and each class, and adjusting the margin value of the training sample is specifically: determining, according to the cosine similarity between the training sample and a corresponding class of parameters of the fully connected layer in a case that the cosine similarity between the training sample and each class of parameters of the fully connected layer is bigger than or equal to 0, the margin value between the training sample and the class.

A method for calculating a margin value is as follows:

$$m_i = \begin{cases} 0, & \text{if } \cos(\theta_i) < 0 \\ \cos(\theta_i), & \text{if } \cos(\theta_i) >= 0 \end{cases}$$

where $\theta_i$ is an included angle between two vectors $\tilde{f}_i$ and $\tilde{w}_{y_i}$, and represents the cosine similarity between sample i and class i in the output result; $\tilde{f}_i$ is a projection feature of sample i; yi is a certain class i; and $\tilde{w}_{y_i}$ is a parameter of column $y_i$ in a matrix of parameters of the fully connected layer.

As shown in the above formula, it indicates that feature classification effects are good in a case that the cosine similarity between the projection feature and each class of matrix parameters is smaller than 0. In this case, the value of $m_i$ is 0. It indicates that the feature classification effects are poor in a case that the cosine similarity between the projection feature and each class of matrix parameters is bigger than or equal to 0, and the margin value is adjusted according to the cosine similarity.

In this application, the margin value is automatically adjusted according to the classification effects of the current sample, ensuring that in a case that the classification effects are poor, a small margin value is added. Such adaptive selection of the margin value ensures that the network can learn better mapping features at the later stage of the training, and greatly reduces training difficulty at the beginning of the training.

In another embodiment, an output result further includes a projection feature of a training sample in a hypersphere feature projection space, and a margin loss is calculated according to the projection feature, a corresponding class of the training sample, a margin value and a cosine similarity.

Optionally, a method for calculating the margin loss is as follows:

$$L_s = -\frac{1}{n}\sum_{i=1}^{n}\log\frac{e^{\tilde{f}_i'\tilde{w}_{y_i}-m_i}}{e^{\tilde{f}_i'\tilde{w}_{y_i}-m_i}+\sum_{j=1,j\neq y_i}^{n}e^{\tilde{f}_i'\tilde{w}_j}}$$

$$= -\frac{1}{n}\sum_{i=1}^{n}\log\frac{e^{R\cos(\theta_i)-m_i}}{e^{R\cos(\theta_i)-m_i}+\sum_{j=1,j\neq y_i}^{n}e^{R\cos(\theta_j)}}$$

where n is the number of samples in the current training; $\tilde{f}_i$ is a projection feature of sample i; $\tilde{w}_{y_i}$ is a parameter of column $y_i$ in a matrix of parameters of a fully connected layer; R is a hypersphere radius; $\theta_i$ is an included angle between two vectors $\tilde{f}_i$ and $\tilde{w}_{y_i}$, and represents the cosine similarity between sample i and class i in the output result; and $m_i$ is a margin value of the sample i.

Optionally, the projection feature is obtained by projecting, according to a space radius of the hypersphere feature projection space applied in the current training, a multi-dimensional feature vector of a training sample into the hypersphere feature projection space.

Optionally, in a case that the loss includes both a hypersphere radius loss and the margin loss, the loss of the classification model is obtained according to the hypersphere radius loss and the margin loss when the loss of the classification model in the training process is calculated.

Optionally, a first product of the hypersphere radius loss and a first weight, and a second product of the margin loss and a second weight are determined; and a sum of the first product and the second product is determined as the loss of the classification model.

Optionally, a value of the second weight can be 1 by default, and the value of the first weight can be λ.

In an example, a method for calculating the loss of the classification model is:

$$L = L_s + \lambda L_R$$

where L is a loss of the classification model; $L_s$ is a value of the margin loss; $L_R$ is a hypersphere radius loss R loss;

and λ is the first weight that controls a proportion of the hypersphere radius loss in the classification model.

In the foregoing classification model training method, a change amount is calculated according to the loss of the classification model in the last training, and the hypersphere radius in the current training is obtained according to the change amount and the hypersphere radius in the last training, namely, the hypersphere radius in the current training is obtained through learning. The learned hypersphere radius is constrained by using the hypersphere radius loss, to prevent the hypersphere radius from getting too big or too small after learning. The method effectively resolves the problem of manual setting of the hypersphere radius, reduces difficulty of parameter adjustment, enhances universality of the training, and improves training effects.

In the foregoing classification model training method, the margin value is automatically adjusted according to the classification effects of the current sample, ensuring that in a case that the classification effects are poor, a small margin value is added. Such adaptive selection of the margin value ensures that the network can learn better mapping features at the later stage of the training, and greatly reduces training difficulty at the beginning of the training.

In the conventional method, L2 regularization is performed on an output feature of a last layer of the network, and then the regularized feature is projected into a hypersphere projection space with a radius R, but there is no reasonable method for selecting a size of the hypersphere radius R, which is a value fixed based on experience. However, in practice, the size of the hypersphere radius depends on training data. Values of the hypersphere radius fluctuate greatly with different training data, and different values of the hypersphere radius greatly affect the training result. Consequently, it is very inconvenient for parameter adjustment to select a fixed value manually, and it is also very difficult to obtain, through adjustment, an optimal value of the hypersphere radius, which directly affects training effects. Meanwhile, a fixed margin value, which is expected to increase training difficulty and make feature mapping obtained through training better, is added forcibly in a case of calculating a sample softmax loss. However, in practice, at the beginning of the training, classification effects of the model are very poor, and if a fixed margin value is directly added, the training loss is very large and non-convergence of the training is caused, increasing the training difficulty at the beginning.

In this embodiment, aiming at the previous two problems, it is proposed that model parameters include a hypersphere radius loss and a margin value. The margin value is a margin value between the training sample and a corresponding class.

Figure 3:
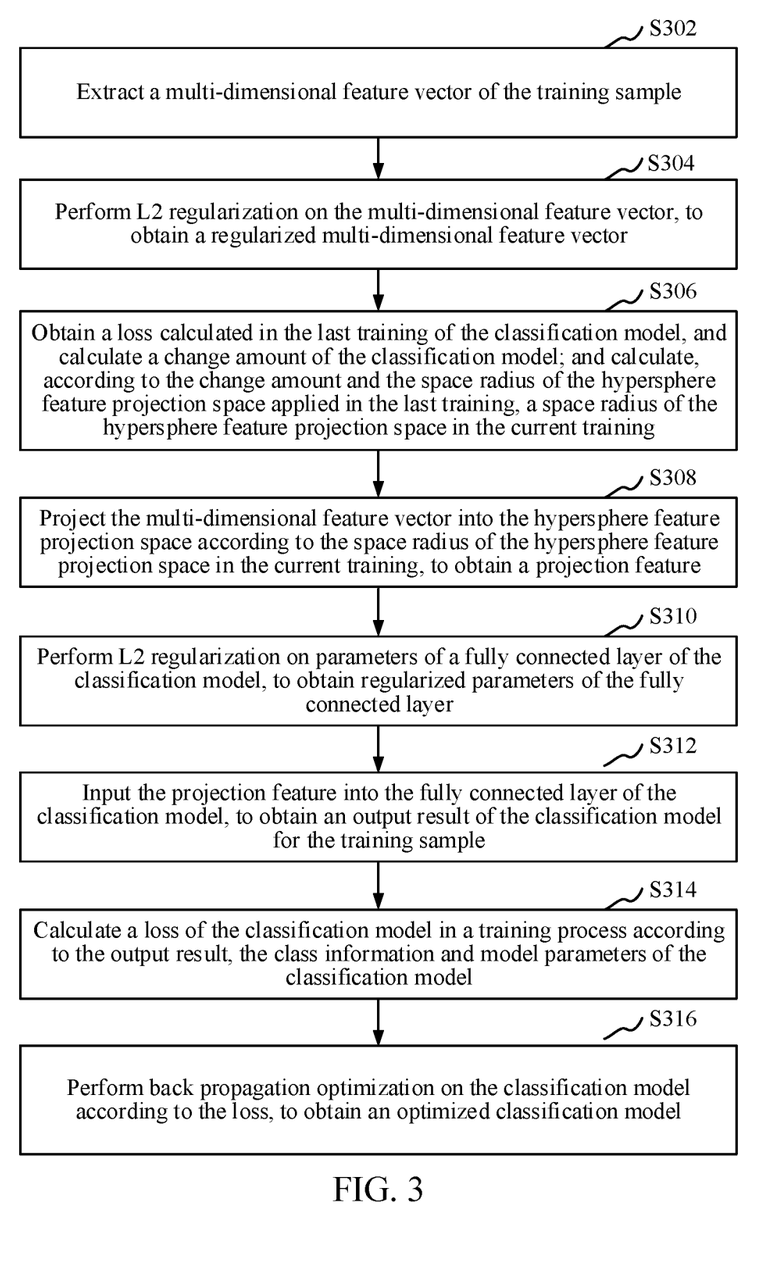
FIG. 3 is a flowchart of a classification model training method according to another embodiment.
Figure 4:
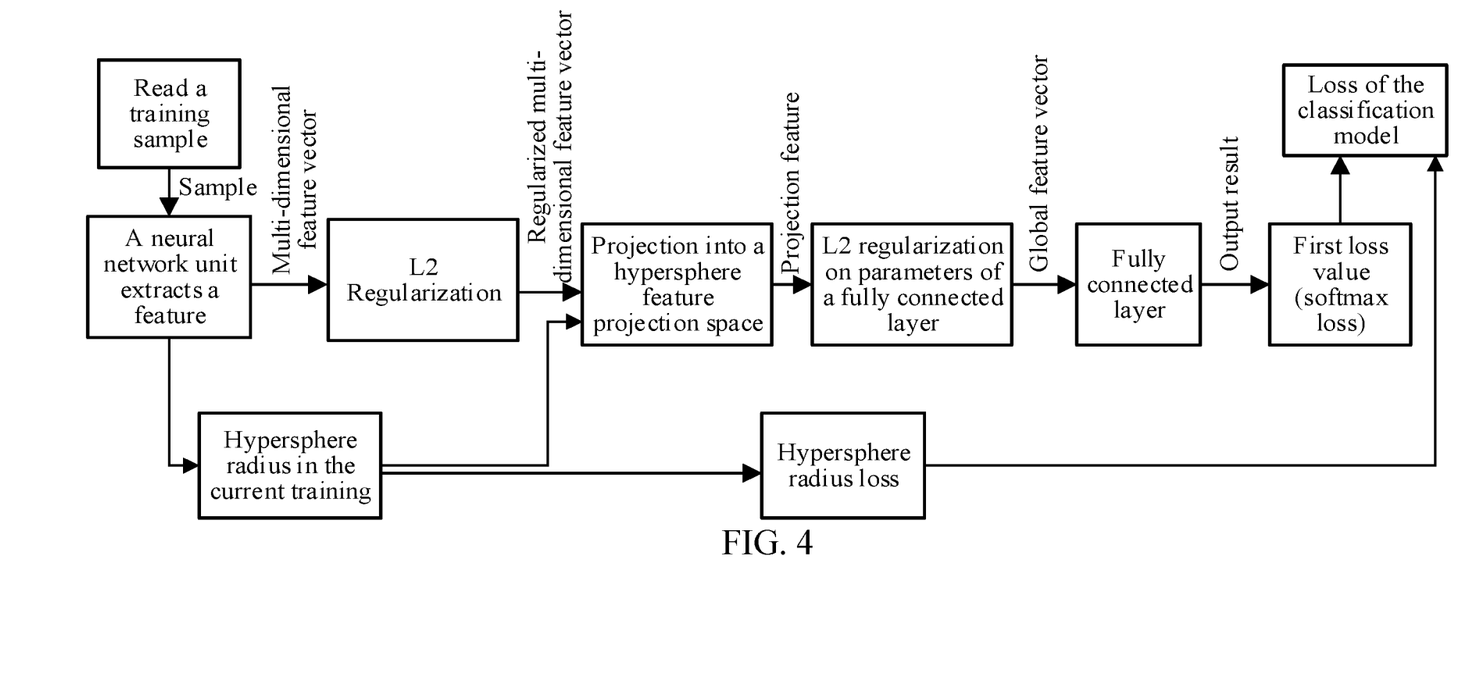
FIG. 4 is a sequence diagram corresponding to the flowchart shown in FIG. 3.

As shown in FIG. 3 and FIG. 4, the classification model training method includes the following steps:

S302. Extract a multi-dimensional feature vector of the training sample.

Optionally, the multi-dimensional feature vector of the training sample is extracted through a convolutional neural network (CNN); and optionally, a $1 \times n_d$-dimension feature vector $f=(f_1, \ldots, f_{n_d})$ is obtained after extracting the feature from the training sample, $n_d$ representing a feature dimension quantity.

Specifically, classification model training is to input enough samples into a network and to adjust a structure of the classification model through a certain algorithm, thereby making an output of the classification model consistent with an expected value. The training sample in this embodiment is sample data required for the classification model training, and can be an image, a sound, a text or the like that is marked.

S304. Perform L2 regularization on the multi-dimensional feature vector, to obtain a regularized multi-dimensional feature vector.

Optionally, the multi-dimensional feature vector is constrained based on an L2 norm, to obtain the regularized multi-dimensional feature vector. An objective of the L2 regularization is to unitize a multi-dimensional feature of the sample. Optionally, a method for calculating the regularized multi-dimensional feature vector includes:

$$\tilde{f} = \frac{f}{\|f\|_2}$$

where $\tilde{f}$ represents a regularized multi-dimensional feature vector; f is a multi-dimensional feature vector; and $\|f\|_2$ is an L2 norm of the feature vector f.

S306. Obtain a loss calculated in the last training of the classification model, and calculate a change amount of the classification model; and calculate, according to the change amount and the space radius of the hypersphere feature projection space applied in the last training, a space radius of the hypersphere feature projection space in the current training.

Optionally, the hypersphere radius is adaptively learned according to the loss of the classification model in the last training before each time of projection.

Optionally, the change amount of the classification model is calculated according to the loss of the classification model in the last training. In the output result of the classification model in the last training, a class with a largest probability is taken as a predicted class, and the accuracy of the predicted result can be determined according to the predicted class and the actual class. The more accurate the predicted result is, the smaller the loss of the classification model is, and the smaller the change amount of the classification model is; and the more deviated the predicted result is, the bigger the loss of the classification model is, and the bigger the change amount of the classification model is. Specifically, the change amount is the change amount of parameters, namely, Δ value, calculated according to the loss in the back propagation in the last training.

A space radius of the hypersphere feature projection space in the current training is calculated according to the change amount and the space radius of the hypersphere feature projection space applied in the last training. The change amount can represent a change amount of the parameters. A bigger change amount represents a bigger adjustment range of the parameters. In this case, feature vectors are projected into the hypersphere feature projection space with a fixed radius, and the distance between the features is close, which is not conducive to feature classification. In this application, the hypersphere radius is adaptively learned according to the change amount, and the size of the feature space is adjusted, so as to make the projections of the features in the hypersphere feature projection space more scattered, promoting the better classification of the features, and reducing the loss of the classification model in the current training.

S308. Project the multi-dimensional feature vector into the hypersphere feature projection space according to the space radius of the hypersphere feature projection space in the current training, to obtain a projection feature.

Optionally, the method for performing projection according to the radius of the hypersphere feature projection space includes:

$$\tilde{f}=R\hat{f}$$

where $\tilde{f}$ is a projection feature; $\hat{f}$ is an L2 regularized multi-dimensional feature vector, and R is a space radius of the hypersphere feature projection space in the current training.

S310. Perform L2 regularization on parameters of the fully connected layer of the classification model, to obtain regularized parameters of the fully connected layer.

To ensure that the training optimization focuses on optimization of vector angles, L2 regularization is also performed on parameters of a fully connected layer of a next layer into which features are inputted in this disclosure, and a regularization formula is as follows:

$$\tilde{W}_j = \frac{W_j}{\|W_j\|_2}$$

where $\tilde{W}_j$ is a parameter of column j in a matrix of regularized parameters of the fully connected layer; $W_j$ is a parameter of column j in the matrix of the parameters of the fully connected layer; and $\|W_j\|_2$ is an L2 norm of $W_j$.

S312. Input the projection feature into the fully connected layer of the classification model, to obtain an output result of the classification model for the training sample.

A function of the fully connected layer is to integrate the projection features, to obtain, according to an input (the projection feature vector) of the fully connected layer and parameters of the fully connected layer, a higher-layer meaning of the sample, namely, a global feature vector to be used for classification later. The fully connected layer (FC) functions as a "classifier" in the whole convolutional neural network.

The classifier is a softmax layer of the classification model. The input of the softmax is a T*1 vector, and the output is also a T*1 vector, each value of the vector representing a probability that the sample belongs to each class. Namely, the output result of the softmax layer is probabilities that the sample belongs to classes.

A response of the classification result of the sample is obtained by multiplying the projected feature by the regularized parameters of the fully connected layer, and a specific implementation formula is as follows:

$$o_{fc}=\tilde{f}\tilde{W}$$

where $o_{fc}$ is an output of the fully connected layer; $\tilde{f}$ is a projection feature; and $\tilde{W}$ is a matrix of the regularized parameters of the fully connected layer.

S314. Calculate a loss of the classification model in a training process according to the output result, the class information and model parameters of the classification model.

Optionally, the model parameters include a hypersphere radius loss and a margin value.

Optionally, the hypersphere radius loss is a part of the loss of the classification model. In this application, by introducing the hypersphere radius loss, the learned hypersphere radius R is constrained, which can prevent the hypersphere radius R from getting too big or too small after learning.

S316. Perform back propagation optimization on the classification model according to the loss, to obtain an optimized classification model.

In this embodiment, the space radius of the hypersphere is obtained by the network through learning, and the learned hypersphere radius is constrained, to prevent a value R from getting too big or too small after learning, effectively resolving the problem of manual setting of the hypersphere radius, reducing difficulty of parameter adjustment, enhancing universality of the training, and improving training effects; and when the margin value is added to a softmax loss, the margin value is automatically adjusted according to the classification effects of the current sample, ensuring that in a case that the classification effects are poor, a small margin value is added. Such adaptive selection of the margin value ensures that the network can learn better mapping features at the later stage of the training, and greatly reduces training difficulty at the beginning of the training.

Figure 5:
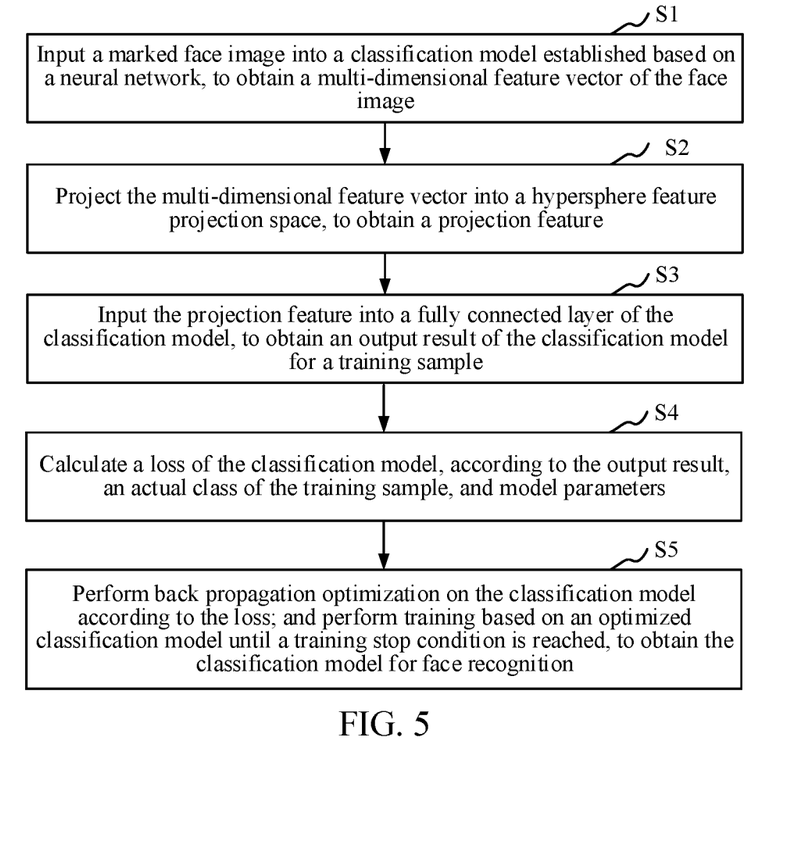
FIG. 5 is a flowchart of a classification model training method according to another embodiment.

In an embodiment, a classification model for face recognition is trained by using a classification model training method. Referring to FIG. 5, a process of training includes the following steps:

S1. Input a marked face image into the classification model established based on a neural network, to obtain a multi-dimensional feature vector of the face image.

S2. Project the multi-dimensional feature vector into a hypersphere feature projection space, to obtain a projection feature.

S3. Input the projection feature into a fully connected layer of the classification model, to obtain an output result of the classification model for a training sample.

S4. Calculate a loss of the classification model according to the output result, an actual class of the training sample, and model parameters.

S5. Perform back propagation optimization on the classification model according to the loss; and perform training based on an optimized classification model until a training stop condition is reached, to obtain the classification model for face recognition.

The face recognition is performed based on the obtained classification model. Optionally, a to-be-recognized face image is obtained, and the to-be-recognized face image is inputted into the classification model; and a recognition result of the to-be-recognized face image is obtained through the classification model.

As shown in the following, taking application of a classification model to the face recognition as an example, three methods are used for training the face recognition model separately, to explain effects of the classification model training method in this application. In the first method, a fixed hypersphere radius R is 30, and an adaptive margin value is not added; in the second method, the hypersphere radius R is learned, and the adaptive margin value is not added; and in the third method, the hypersphere radius R is learned, and the adaptive margin value is added.

Figure 6:
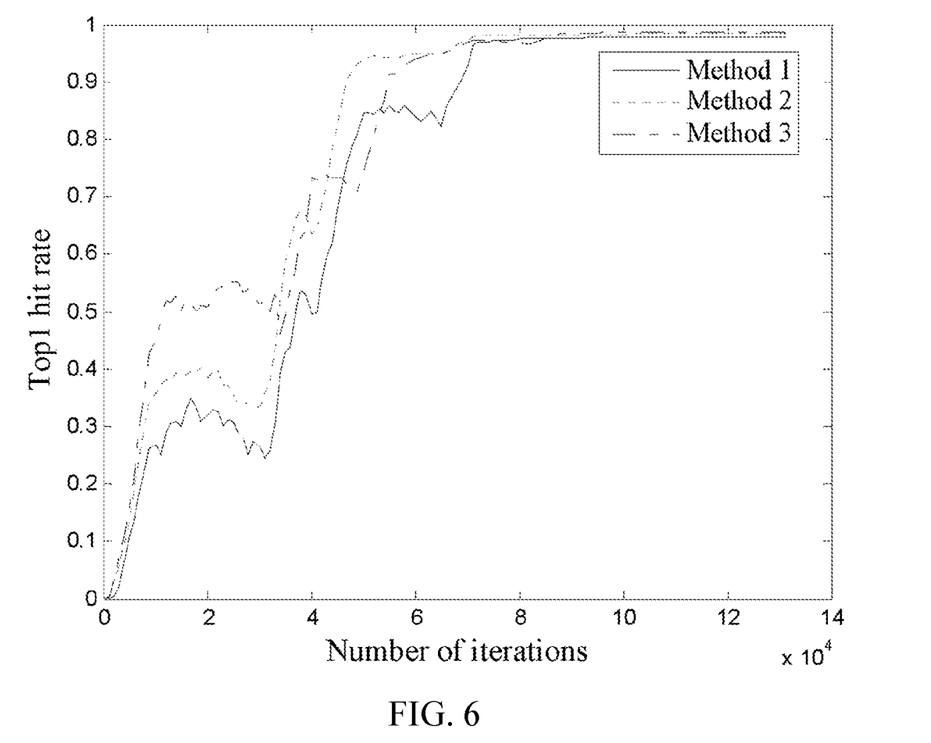
FIG. 6 is a schematic diagram of classification accuracy change curves of model evaluation data sets of three methods.

FIG. 6 shows classification accuracy change curves of model evaluation data sets of three methods, and it can be seen from FIG. 6 that the third method has the best effect.

Table 1 shows test results in actual service data, and actual service data sets include data of an experiment in 1:1 and data of an experiment in 1:N, the two experiments corresponding to a face-based identity verification service and face recognition service respectively.

TABLE 1

Actual service evaluation set information

| Name of actual service evaluation set | | Total number of identities | Data set scenario description |
|---|---|---|---|
| Evaluation set of experiment in 1:1 | TCSetFV_IdQzl | 497 | High-definition identity photo and self-portrait |
| | TCSetFV_Qzl | 698 | Identity photo and self-portrait |
| | TCSetFV_WmCam | 1000 | Self-portrait by mobile phone, de-speckled photo, and high-definition identity photo |
| Evaluation set of experiment in 1:N | TCSetFR_cam | 1000 | Monitoring scene photo collected by IP Cam |
| | TCSetFR_id | 1000 | High-definition identity photo corresponding to TCSetFR_cam |
| | TCSetFR_ZJZ300W | 2982921 | High-definition identity photo |

TABLE 2

Results of the face comparison experiment in 1:1

| | Name of actual service evaluation set | | | | | |
|---|---|---|---|---|---|---|
| | TCSetFV_Qzl | | TCSetFV_IdQzl | | TCSetFV_hIdCaml | |
| Method type | FAR = 0.1% | FAR = 0.01% | FAR = 0.1% | FAR = 0.01% | FAR = 0.01% | FAR = 0.01% |
| Method 1 | 94.54% | 92.44% | 97.23% | 93.05% | 98.33% | 97.00% |
| Method 2 | 95.17% | 93.97% | 98.54% | 97.09% | 98.67% | 98.39% |
| Method 3 | 95.32% | 94.48% | 98.77% | 97.83% | 98.67% | 98.61% |

TABLE 3

Results of the face recognition experiment in 1:N

| | Name of actual service evaluation set | | | |
|---|---|---|---|---|
| | Test set: TCSetFR_cam; Registration set: TCSetFR_id + TCSetFR_ZJZ300W (Registered scale of 3 million) | | | |
| Method type | Top 1 | far = one in a million | far = one in 10 million | far = one in 100 million |
| Method 1 | 81.45% | 83.53% | 68.91% | 53.30% |
| Method 2 | 87.67% | 90.47% | 82.73% | 68.20% |
| Method 3 | 92.67% | 95.47% | 88.87% | 81.53% |

In the tables, far represents a false acceptance rate, and Top1 represents a first-time hit rate. It can be seen from the comparison results in the tables that, the method 3 is provided with a highest pass rate with the same far value both in the face comparison experiment in 1:1 and the face recognition experiment in 1:N.

The foregoing experimental results fully prove that the classification model training method put forward in this application is very effective in the field of face recognition, effectively improves effects of the face recognition, and can be widely used in many products related to face recognition technologies, such as public security, finance, and e-government.

Figure 7:
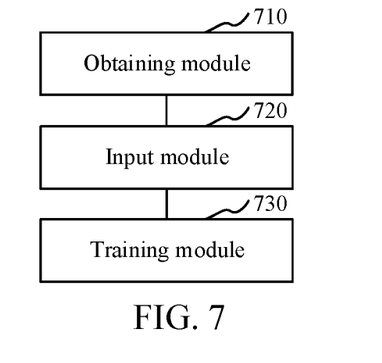
FIG. 7 is a structural block diagram of a face recognition apparatus according to an embodiment.

In another embodiment, a face recognition apparatus is provided. As shown in FIG. 7, the apparatus includes:

an obtaining module 710, configured to obtain a to-be-recognized face image;

an input module 720, configured to input the face image into a classification model, and obtain a recognition result of the to-be-recognized face image through the classification model; and a training module 730, configured to obtain the classification model by inputting a training sample marked with class information into a classification model and outputting an output result of the training sample, calculating a loss of the classification model in a training process according to the output result, the class information and model parameters of the classification model, and performing back propagation optimization on the classification model according to the loss.

In an optional embodiment, the loss includes at least one of a hypersphere radius loss and a margin loss;

the classification model includes a hypersphere feature projection space, the hypersphere feature projection space corresponds to a space radius, and the hypersphere radius loss is used for representing a loss of the space radius corresponding to the hypersphere feature projection space; and the margin loss is used for representing an incidental loss of the classification model in a recognition process.

In an optional embodiment, the loss includes the hypersphere radius loss; and the training module 730 is further configured to obtain a loss calculated in the last training of the classification model, and calculate a change amount of the classification model; calculate, according to the change amount and the space radius applied in the last training, the space radius of the hypersphere feature projection space applied in the current training; and calculate the hypersphere radius loss according to the space radius of the hypersphere feature projection space applied in the current training.

In an optional embodiment, the loss includes the margin loss; and the training module 730 is further configured to determine, according to the output result of the training sample, a cosine similarity between the training sample and a corresponding class of the class information; calculate, according to the cosine similarity, the margin value between the training sample and the corresponding class; and calculate the margin loss according to the margin value and the output result.

In an optional embodiment, the output result includes a projection feature of the training sample in the hypersphere feature projection space; and the training module 730 is further configured to calculate the margin loss according to the projection feature, the corresponding class of the training sample, the margin value, and the cosine similarity.

In an optional embodiment, the training module 730 is further configured to project, according to the space radius of the hypersphere feature projection space applied in the current training, a multi-dimensional feature vector of the training sample into the hypersphere feature projection space, to obtain the projection feature.

In an optional embodiment, in a case that the loss includes the hypersphere radius loss and the margin loss, the training module 730 is further configured to obtain the loss of the classification model according to the hypersphere radius loss and the margin loss.

In an optional embodiment, the training module 730 is further configured to determine a first product of the hypersphere radius loss and a first weight, and a second product of the margin loss and a second weight; and determine a sum of the first product and the second product as the loss of the classification model.

In an optional embodiment, the training module 730 is further configured to perform L2 regularization on the multi-dimensional feature vector, to obtain a regularized multi-dimensional feature vector; and project the regularized multi-dimensional feature vector into the hypersphere feature projection space, to obtain the projection feature.

In an optional embodiment, the classification model includes a fully connected layer; and the training module 730 is further configured to perform L2 regularization on parameters of the fully connected layer, to obtain regularized parameters of the fully connected layer; and apply the regularized parameters of the fully connected layer to the fully connected layer.

Figure 8:
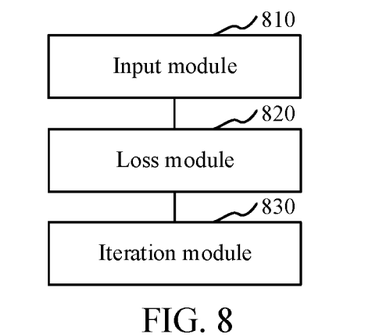
FIG. 8 is a structural block diagram of a classification model training apparatus according to an embodiment.

Optionally, a classification model training apparatus is further provided in an embodiment of this application. As shown in FIG. 8, the apparatus includes:

an input module 810, configured to input a training sample marked with class information into a classification model and output an output result of the training sample;

a loss module 820, configured to calculate a loss of the classification model in a training process according to the output result, the class information and model parameters of the classification model; and an iteration module 830, configured to perform back propagation optimization on the classification model according to the loss, to obtain an optimized classification model.

Figure 9:
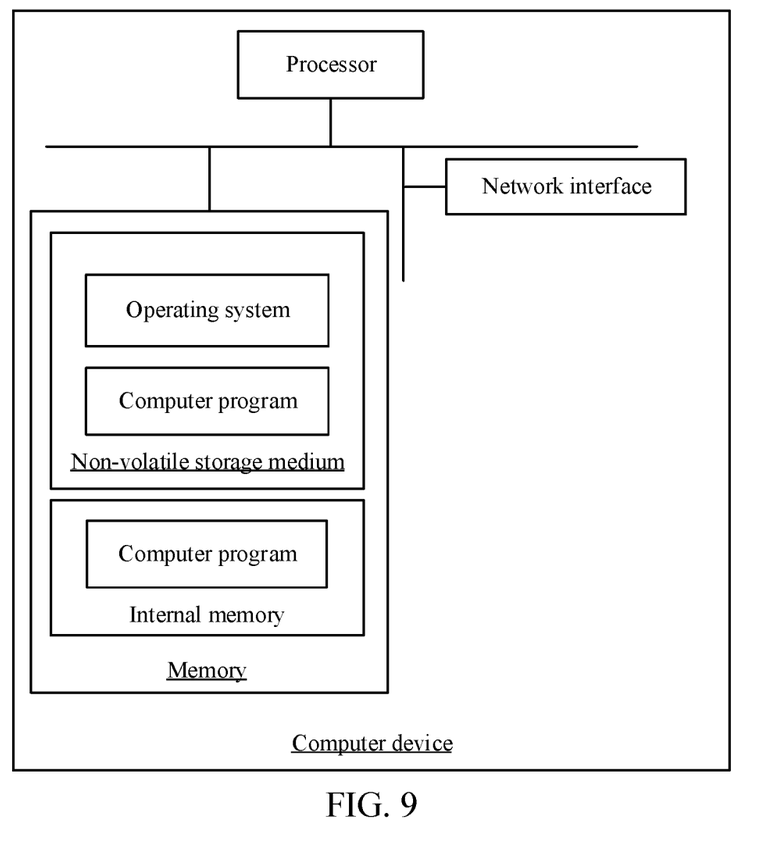
FIG. 9 is a structural block diagram of a computer device according to an embodiment.

FIG. 9 is an internal structure diagram of a computer device according to an embodiment. The computer device may be specifically a server. As shown in FIG. 9, the computer device includes a processor, a memory, and a network interface connected by using a system bus. The memory includes a non-volatile storage medium and an internal memory. The non-volatile storage medium of the computer device stores an operating system and may further store a computer program, the computer program, when executed by the processor, causing the processor to implement a classification model training method. The internal memory may also store a computer program, the computer program, when executed by the processor, causing the processor to perform the classification model training method.

A person skilled in the art may understand that, the structure shown in FIG. 9 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a classification model training apparatus provided in this application may be implemented in a form of a computer program, and the computer program may be run on the computer device shown in FIG. 9. A memory of the computer device may store program modules forming the classification model training apparatus, for example, the obtaining module, the input module and the training module shown in FIG. 7. The computer program formed by the program modules causes the processor to perform steps in the classification model training method in the embodiments of this application described in this specification.

For example, the computer device shown in FIG. 9 can perform, through the input module in the classification model training apparatus shown in FIG. 8, a step of inputting a training sample into a classification model established based on a neural network, to obtain a multi-dimensional feature vector of the training sample. The computer device can perform, through a projection module, a step of projecting the multi-dimensional feature vector into a hypersphere feature projection space, to obtain a projection feature. The computer device can perform, through an output module, a step of inputting the projection feature into a fully connected layer of the classification model, to obtain the output result of the classification model for the training sample.

A non-transitory computer-readable storage medium stores a plurality of computer programs, the computer programs, when executed by a processor, causing the processor to perform the following steps:

obtaining a to-be-recognized face image; and inputting the face image into a classification model, and obtaining a recognition result of the to-be-recognized face image through the classification model, the classification model being obtained by inputting a training sample marked with class information into a classification model and outputting an output result of the training sample, calculating a loss of the classification model in a training process according to the output result, the class information and model parameters of the classification model, and performing back propagation optimization on the classification model according to the loss.

In an optional embodiment, the loss includes at least one of a hypersphere radius loss and a margin loss;

the classification model includes a hypersphere feature projection space, the model parameters include a space radius corresponding to the hypersphere feature projection space, and the hypersphere radius loss is used for representing a loss of the space radius corresponding to the hypersphere feature projection space; and the margin loss is used for representing an incidental loss of the classification model in a recognition process, and the model parameters include a margin value between the training sample and a class in the classification model.

In an optional embodiment, the loss includes the hypersphere radius loss;

before the inputting a training sample marked with class information into a classification model, the following steps are included:

obtaining a loss calculated in the last training of the classification model, and calculating a change amount of the classification model; and calculating, according to the change amount and the space radius applied in the last training, the space radius of the hypersphere feature projection space applied in the current training; and the calculating a loss of the classification model in a training process includes:

calculating the hypersphere radius loss according to the space radius of the hypersphere feature projection space applied in the current training.

In an optional embodiment, the loss includes the margin loss; and the calculating a loss of the classification model in a training process includes:

determining, according to the output result of the training sample, a cosine similarity between the training sample and a corresponding class of the class information;

calculating, according to the cosine similarity, the margin value between the training sample and the corresponding class; and calculating the margin loss according to the margin value and the output result.

In an optional embodiment, the output result includes a projection feature of the training sample in the hypersphere feature projection space; and the calculating the margin loss according to the margin value and the output result includes:

calculating the margin loss according to the projection feature, the corresponding class of the training sample, the margin value, and the cosine similarity.

In an optional embodiment, a method for determining the projection feature includes:

projecting, according to the space radius of the hypersphere feature projection space applied in the current training, a multi-dimensional feature vector of the training sample into the hypersphere feature projection space, to obtain the projection feature.

In an optional embodiment, in a case that the loss includes the hypersphere radius loss and the margin loss, the calculating a loss of the classification model in a training process includes:

obtaining the loss of the classification model according to the hypersphere radius loss and the margin loss.

In an optional embodiment, the obtaining the loss of the classification model according to the hypersphere radius loss and the margin loss includes:

determining a first product of the hypersphere radius loss and a first weight, and a second product of the margin loss and a second weight; and determining a sum of the first product and the second product as the loss of the classification model.

In an optional embodiment, the projecting a multi-dimensional feature vector of the training sample into the hypersphere feature projection space, to obtain the projection feature further includes:

performing L2 regularization on the multi-dimensional feature vector, to obtain a regularized multi-dimensional feature vector; and projecting the regularized multi-dimensional feature vector into the hypersphere feature projection space, to obtain the projection feature.

In an optional embodiment, the classification model includes a fully connected layer;

before the inputting a training sample marked with class information into a classification model and outputting an output result of the training sample, the following steps are further included:

performing L2 regularization on parameters of the fully connected layer, to obtain regularized parameters of the fully connected layer; and applying the regularized parameters of the fully connected layer to the fully connected layer.

According to the foregoing computer-readable storage medium, the model parameters of the classification model are adjusted according to the output result of the training sample, other model parameters are taken into consideration based on the conventional softmax loss, and the loss of the classification model is calculated according to the softmax loss and the model parameters, so that the obtained loss of the classification model in the method in this application continuously decreases in the training process, to avoid a problem that the loss does not decrease in a long time in the training process, thereby increasing training efficiency of the classification model.

An embodiment of this application further provides a computer device. The computer device includes a memory and a processor, the memory storing at least one instruction, at least one program, a code set or an instruction set. The at least one instruction, the at least one program, the code set or the instruction set is loaded and executed by the processor, to implement the foregoing face recognition method and the foregoing classification model training method.

An embodiment of this application further provides a computer-readable storage medium, the readable storage medium storing at least one instruction, at least one program, a code set or an instruction set. The at least one instruction, the at least one program, the code set or the instruction set is loaded and executed by the processor, to implement the foregoing face recognition method and the foregoing classification model training method.

This application further provides a computer program product. The computer program product causes, when running on a computer, the computer to perform the face recognition method and the classification model training method provided in the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiments; or may be a computer-readable storage medium that exists alone and is not assembled into a terminal. The computer-readable storage medium stores at least one instruction, at least one program, a code set or an instruction set. The at least one instruction, the at least one program, the code set or the instruction set is loaded and executed by a processor, to implement the foregoing face recognition method and the foregoing classification model training method.

Optionally, the computer-readable storage medium may include: a read-only memory (ROM), a random access memory (RAM), a solid state drive (SSD), an optional disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optional disc.

The above embodiments only describe several implementations of this application, and are described in detail, but are not be construed as a limitation to the patent scope of this application. A person of ordinary skill in the art may further make variations and improvements without departing from the ideas of this application, which all fall within the protection scope of this application. Therefore, the protection scope of this application is to be subject to the protection scope of the appended claims.

What is claimed is:

1. A face recognition method, applied to a server having one or more processors and memory storing a plurality of computer programs to be executed by the one or more processors, the method comprising:
   obtaining a to-be-recognized face image;
   inputting the face image into a classification model; and
   obtaining a recognition result of the to-be-recognized face image through the classification model,
   wherein the classification model is obtained by:
      inputting a training sample marked with class information into the classification model,
      outputting an output result of the training sample,
      calculating a loss of the classification model in a training process according to the output result, the class information and model parameters of the classification model, wherein the classification model comprises a hypersphere feature projection space, the model parameters of the classification model comprise (i) a space radius corresponding to the hypersphere feature projection space and (ii) a margin value between the training sample and a class in the classification model, the calculating the loss of the classification model further comprising:
      calculating a hypersphere radius loss of the space radius corresponding to the hypersphere feature projection space;
      calculating a margin loss according to the margin value and the output result of the training sample;
      obtaining the loss of the classification model according to the hypersphere radius loss and the margin loss; and
      performing back propagation optimization on the classification model according to the loss, further comprising adjusting the model parameters of the classification model according to the hypersphere radius loss and the margin loss.

2. The method according to claim 1, wherein
   the hypersphere radius loss is used for representing a loss of the space radius corresponding to the hypersphere feature projection space; and
   the margin loss is used for representing an incidental loss of the classification model in a recognition process.

3. The method according to claim 2, wherein,
   before the inputting a training sample marked with class information into a classification model, the method comprises:
   obtaining a loss calculated in a last training of the classification model, and calculating a change amount of the classification model; and
   calculating, according to the change amount of the classification model and the space radius applied in the last training, the space radius of the hypersphere feature projection space applied in the current training; and
   the calculating the hypersphere radius loss of the space radius corresponding to the hypersphere feature projection space further comprises:
   calculating the hypersphere radius loss according to the space radius of the hypersphere feature projection space applied in the current training.

4. The method according to claim 2, wherein the calculating the margin loss according to the margin value and the output result of the training sample further comprises:
   determining, according to the output result of the training sample, a cosine similarity between the training sample and a corresponding class of the class information;
   calculating, according to the cosine similarity, the margin value between the training sample and the corresponding class; and
   calculating the margin loss according to the margin value and the output result.

5. The method according to claim 4, wherein the output result comprises a projection feature of the training sample in the hypersphere feature projection space; and
   the calculating the margin loss according to the margin value and the output result comprises:
   calculating the margin loss according to the projection feature, the corresponding class of the training sample, the margin value, and the cosine similarity.

6. The method according to claim 5, wherein the method comprises:
   projecting, according to the space radius of the hypersphere feature projection space applied in the current training, a multi-dimensional feature vector of the training sample into the hypersphere feature projection space, to obtain the projection feature.

7. The method according to claim 1, wherein the obtaining the loss of the classification model according to the hypersphere radius loss and the margin loss comprises:
   determining a first product of the hypersphere radius loss and a first weight, and a second product of the margin loss and a second weight; and
   determining a sum of the first product and the second product as the loss of the classification model.

8. The method according to claim 6, wherein the projecting a multi-dimensional feature vector of the training sample into the hypersphere feature projection space, to obtain the projection feature further comprises:
   performing L2 regularization on the multi-dimensional feature vector, to obtain a regularized multi-dimensional feature vector; and
   projecting the regularized multi-dimensional feature vector into the hypersphere feature projection space, to obtain the projection feature.

9. The method according to claim 1, wherein the classification model comprises a fully connected layer;
   before the inputting a training sample marked with class information into a classification model and outputting an output result of the training sample, the method further comprises:
   performing L2 regularization on parameters of the fully connected layer, to obtain regularized parameters of the fully connected layer; and
   applying the regularized parameters of the fully connected layer to the fully connected layer.

10. A server, comprising one or more processors and memory, the memory storing a plurality of computer programs, and the computer programs, when executed by the one or more processors, causing the server to perform a plurality of operations including:
    obtaining a to-be-recognized face image;
    inputting the face image into a classification model; and
    obtaining a recognition result of the to-be-recognized face image through the classification model,
    wherein the classification model is obtained by:
       inputting a training sample marked with class information into the classification model,
       outputting an output result of the training sample,
       calculating a loss of the classification model in a training process according to the output result, the class information and model parameters of the classification model, wherein the classification model comprises a hypersphere feature projection space, the model parameters of the classification model comprise (i) a space radius corresponding to the hypersphere feature projection space and (ii) a margin value between the training sample and a class in the classification model, the calculating the loss of the classification model further comprising:
- calculating a hypersphere radius loss of the space radius corresponding to the hypersphere feature projection space;
- calculating a margin loss according to the margin value and the output result of the training sample;
- obtaining the loss of the classification model according to the hypersphere radius loss and the margin loss; and
- performing back propagation optimization on the classification model according to the loss, further comprising adjusting the model parameters of the classification model according to the hypersphere radius loss and the margin loss.

11. The server according to claim 10, wherein
the hypersphere radius loss is used for representing a loss of the space radius corresponding to the hypersphere feature projection space; and
the margin loss is used for representing an incidental loss of the classification model in a recognition process.

12. The server according to claim 11, wherein the plurality of operations further comprise:
- before inputting a training sample marked with class information into a classification model;
- obtaining a loss calculated in a last training of the classification model, and calculating a change amount of the classification model; and
- calculating, according to the change amount of the classification model and the space radius applied in the last training, the space radius of the hypersphere feature projection space applied in the current training; and
- the calculating the hypersphere radius loss of the space radius corresponding to the hypersphere feature projection space further comprises;
- calculating the hypersphere radius loss according to the space radius of the hypersphere feature projection space applied in the current training.

13. The server according to claim 11, wherein the calculating the margin loss according to the margin value and the output result of the training sample further comprises:
- determining, according to the output result of the training sample, a cosine similarity between the training sample and a corresponding class of the class information;
- calculating, according to the cosine similarity, the margin value between the training sample and the corresponding class; and
- calculating the margin loss according to the margin value and the output result.

14. The server according to claim 13, wherein the output result comprises a projection feature of the training sample in the hypersphere feature projection space; and
the calculating the margin loss according to the margin value and the output result comprises:
- calculating the margin loss according to the projection feature, the corresponding class of the training sample, the margin value, and the cosine similarity.

15. The server according to claim 14, wherein the plurality of operations further comprise:
- projecting, according to the space radius of the hypersphere feature projection space applied in the current training, a multi-dimensional feature vector of the training sample into the hypersphere feature projection space, to obtain the projection feature.

16. The server according to claim 10, wherein the obtaining the loss of the classification model according to the hypersphere radius loss and the margin loss comprises:
- determining a first product of the hypersphere radius loss and a first weight, and a second product of the margin loss and a second weight; and
- determining a sum of the first product and the second product as the loss of the classification model.

17. The server according to claim 15, wherein the projecting a multi-dimensional feature vector of the training sample into the hypersphere feature projection space, to obtain the projection feature further comprises:
- performing L2 regularization on the multi-dimensional feature vector, to obtain a regularized multi-dimensional feature vector; and
- projecting the regularized multi-dimensional feature vector into the hypersphere feature projection space, to obtain the projection feature.

18. A non-transitory computer-readable storage medium, storing a plurality of computer programs, the computer programs, when executed by one or more processors of a server, causing the server to perform a plurality of operations including:
- obtaining a to-be-recognized face image;
- inputting the face image into a classification model; and
- obtaining a recognition result of the to-be-recognized face image through the classification model,
wherein the classification model is obtained by:
- inputting a training sample marked with class information into the classification model,
- outputting an output result of the training sample,
- calculating a loss of the classification model in a training process according to the output result, the class information and model parameters of the classification model, wherein the classification model comprises a hypersphere feature projection space, the model parameters of the classification model comprise (i) a space radius corresponding to the hypersphere feature projection space and (ii) a margin value between the training sample and a class in the classification model, the calculating the loss of the classification model further comprising:
  - calculating a hypersphere radius loss of the space radius corresponding to the hypersphere feature projection space;
  - calculating a margin loss according to the margin value and the output result of the training sample;
  - obtaining the loss of the classification model according to the hypersphere radius loss and the margin loss; and
- performing back propagation optimization on the classification model according to the loss, further comprising adjusting the model parameters of the classification model according to the hypersphere radius loss and the margin loss.

19. The non-transitory computer-readable storage medium according to claim 18, wherein the hypersphere radius loss is used for representing a loss of the space radius corresponding to the hypersphere feature projection space; and the margin loss is used for representing an incidental loss of the classification model in a recognition process.

20. The non-transitory computer-readable storage medium according to claim 19, wherein the plurality of operations further comprise:

before inputting a training sample marked with class information into a classification model;

obtaining a loss calculated in a last training of the classification model, and calculating a change amount of the classification model; and calculating, according to the change amount of the classification model and the space radius applied in the last training, the space radius of the hypersphere feature projection space applied in the current training; and the calculating the hypersphere radius loss of the space radius corresponding to the hypersphere feature projection space further comprises;

calculating the hypersphere radius loss according to the space radius of the hypersphere feature projection space applied in the current training; and the calculating the margin loss according to the margin value and the output result of the training sample further comprises;

determining, according to the output result of the training sample, a cosine similarity between the training sample and a corresponding class of the class information;

calculating, according to the cosine similarity, the margin value between the training sample and the corresponding class; and calculating the margin loss according to the margin value and the output result.

\* \* \* \* \*